United States Patent Office 3,541,081
Patented Nov. 17, 1970

3,541,081
PREPARATION OF ε,ε'-BIS(ε-CAPROLACTAM)
Robert J. De Kock and Antonie Veermans, Geleen, and Pierre J. Franssen, Stein, Netherlands, assignors to Stamicarbon N.V., Heerlen, Netherlands
No Drawing. Filed May 27, 1968, Ser. No. 732,039
Claims priority, application Netherlands, May 27, 1967, 6707400
Int. Cl. C07d 41/06
U.S. Cl. 260—239.3     3 Claims

ABSTRACT OF THE DISCLOSURE

A process for dimerizing ε-caprolactam to ε,ε'-bis(ε-caprolactam) is disclosed, wherein ε-caprolactam is heated together with a hydrocarbon peroxide, such as ditertiary-butyl peroxide, dicumyl peroxide, tertiary-butyl cumyl peroxide, or dicyclohexylidene diperoxide, in a ratio of 10 to about 50 moles of lactam per mole of peroxide.

BACKGROUND OF THE INVENTION

It is known that ε-caprolactam in the liquid phase can be dimerized to ε,ε'-bis(ε-caprolactam) by irradiation with ultraviolet rays.

Some chemical reactions that are effected by irradiation and which can be explained theoretically by the activity of the radicals formed by the irradiation, can also be brought about in another way by means of substances forming radicals. However, no generally applicable rule can be based on this radical theory.

From our experiments carried out in this respect it appears that the irradiation of caprolactam cannot generally be replaced by a reaction by means of substances forming radicals. Many substances that are known to produce radicals, such as azonitriles, e.g. diazo-isobutyronitrile, and hydroperoxides, e.g. tertiary-butyl hydroperoxide, or other percompounds, such as peracids, e.g. perbenzoic acid, and peresters, e.g. tertiarybutyl perbenzoate and butyl cyclohexyl percarbonate, as well as acyl peroxides, such as benzoyl peroxide and capryloyl peroxide, are not suitable to dimerize ε-caprolactam to ε,ε'-bis(ε-caprolactam).

SUMMARY OF THE INVENTION

ε,ε'-Bis(ε-caprolactam) is prepared by the dimerization of ε-caprolactam, wherein ε-caprolactam in the liquid phase is heated at a temperature of about 75 to about 150° C. together with a hydrocarbon peroxide in a molar ratio of 10 to about 50 moles of lactam per mole of peroxide. Suitable peroxides include ditertiary-butyl peroxide, dicumyl peroxide, tertiary-butyl cumyl peroxide, and dicyclohexylidene diperoxide.

DETAILED DESCRIPTION OF THE INVENTION

A process has now been found for preparing ε,ε'-bis(ε-caprolactam) by dimerization of ε-caprolactam, in which ε-caprolactam in the liquid phase is heated at a temperature of 75–150° C. together with a hydrocarbon peroxide in a molar ratio of 10 to about 50 moles of lactam per mole of peroxide, preferably 20 to 30 moles of lactam.

The process according to the invention can be carried out in a simple way by adding the peroxide to molten lactam and heating the mixture. The reaction temperature can suitably by varied within the temperature range of 75–150° C., partly in dependence on the nature of the peroxide used. No better conversion to the desired ε,ε'-bis(ε-caprolactam) is obtained at temperatures over 150° C., but undesirable products will be formed at such increased temperatures owing to rapid exothermic reactions. The hydrocarbon peroxides utilized in the present invention are selected from the group consisting of dicyclohexylidene diperoxide and a hydrocarbon peroxide of the general formula:

R—O—O—R' wherein R and R' are hydrocarbon radicals having up to 12 carbon atoms such as methyl, ethyl, isopropyl, hexyl, dodecyl, cumyl and the like. Particularly preferred peroxides are ditertiary butyl peroxide, dicumyl peroxide, tertiary butyl cumyl peroxide, and dicyclohexylidene diperoxide.

The dimerization of reaction is preferably conducted at atmospheric pressures but may be used at higher or lower pressures as desired.

The amount of hydrocarbon peroxide may be varied, it being seen to that there is an excess amount of lactam of 10 to 50 moles of lactam per mole of peroxide. At smaller amounts of lactam hardly any ε,ε'-bis(ε-caprolactam) is found in the reaction product. Very large amounts of over 50 moles of lactam per mole of peroxide do not result in higher outputs, but may be used if desired.

Example I 4000 g. of ε-caprolactam is melted and mixed with 411 g. of dicumyl peroxide (molar ratio 23:1) and the resulting mixture is heated at atmospheric pressure at 140° C. for 20 hours. During the reaction gas evolves regularly.

After being cooled to 70° C., the reaction product is mixed with 13,000 g. of acetone and subsequently cooled further to 20–25° C., when a precipitate of ε,ε'-bis(ε-caprolactam) is formed, which is separated by filtration.

The yield is 67 g. of ε,ε'-bis(ε-caprolactam), which corresponds to an efficiency of 19.7% with respect to the peroxide.

Example II

The experiment described in Example I is repeated with the difference that the reaction product is processed in another way.

The reaction product is distilled until 3500 g. of caprolactam has been recovered. The residue is then cooled to 70° C. and mixed with 3000 g. of acetone, and the mixture is cooled further to 20–25° C. and filtered.

In this way 102 g. of ε,ε'-bis(ε-caprolactam) is obtained (efficiency with respect to the peroxide: 30%).

Example III

Dimerization experiments using some mixtures of ε-caprolactam and dicumyl peroxide in various molar lactam/peroxide ratios are carried out at 140° C. in a way similar to that described in Example II.

The resulting yield of ε,ε'-bis(ε-caprolactam) is (efficiency, in percent with respect to the peroxide):

| Molar ratio | Yield percent |
|---|---|
| 2:1 | Nil |
| 10:1 | 15 |
| 23:1 | 30 |
| 27:1 | 25 |
| 50:1 | 21 |

From these results it appears that it is preferable to use 20–30 moles of caprolactam per mole of peroxide in the lactam/peroxide range of 10 to about 50 moles of caprolactam per mole of peroxide.

Example IV 11.2 g. of dietertiary-butyl peroxide is added to 200 g. of ε-caprolactam (23 moles of lactam per mole of peroxide) and the mixture is heated at 130° C. for 40 hours at atmospheric pressure.

The reaction product is processed in the way described in Example II.

The yield is 4.25 g. of ε,ε'-bis(ε-caprolactam), which corresponds to an efficiency of 24.7% with respect to the peroxide.

A similar result is obtained when this experiment is repeated with tertiarybutyl cumyl peroxide (molar ratio 23:1) and also with dicyclohexylidene diperoxide (molar ratio 23:1).

Examples V–X

Experiments with substances forming radicals (same molar ratio as in Example IV) are carried out in a way similar to that described in Example IV. The reaction time and temperature are given in the table. It appears that no ε,ε'-bis(ε-caprolactam) is obtained in these experiments.

| Example No. | Substance forming radicals | Time (h.) | Temp. (° C.) | ε,ε'-bis (ε-capro- lactam) |
|---|---|---|---|---|
| V | Tertiary-butyl perbenzoate | 17 | 120 | Nil. |
| VI | Capryloyl-peroxide | 17 | 90 | Nil. |
| VII | Butyl cyclohexyl percarbonate | 23 | 80 | Nil. |
| VIII | Tertiary-butyl hydroperoxide | 24 | 125 | Nil. |
| IX | Diazo-isobutyronitrile | 21 | 120 | Nil. |
| X | Perbenzoic acid (dissolved in ethyl acetate) | 35 | 75 | Nil. |

Obviously many modifications and variations of the present invention are possible in the light of the above teachings. It is, therefore, to be understood that within the scope of the appended claims, the invention may be practiced otherwise than as specifically described.

We claim:
1. In a process for preparing ε,ε-bis(ε-caprolactam) by the dimerization of ε-caprolactam, wherein the ε-caprolactam is dimerized by heating in the liquid phase at temperatures of 75 to about 150° C., the improvement comprising conducting the dimerization in the presence of at least one peroxide selected from the group consisting of dicyclohexylidene-diperoxide and a hydrocarbon peroxide of the general formula

R—O—O—R' wherein R and R' are hydrocarbon radicals having up to 12 carbon atoms, wherein the molar ratio of the lactam to the peroxide is in the range of 10 to about 50 moles per mole.

2. The process as claimed in claim 1, wherein said peroxide is selected from the group consisting of ditertiary butyl peroxide, dicumyl peroxide, tertiary butyl cumyl peroxide and dicyclohexylidene diperoxide.

3. The process as claimed in claim 1 wherein the said molar ratio is 20 to 30 moles of lactam per mole of peroxide.

References Cited

FOREIGN PATENTS 1,521,938  3/1968  France.

HENRY R. JILES, Primary Examiner

R. T. BOND, Assistant Examiner

UNITED STATES PATENT OFFICE
CERTIFICATE OF CORRECTION

Patent No. 3,541,081    Dated November 17, 1970

Inventor(s) Robert J. De Kock et al.

It is certified that error appears in the above-identified patent and that said Letters Patent are hereby corrected as shown below:

Column 4, line 12, after "atoms" insert -- and cumyl --.

Signed and sealed this 13th day of April 1971.

(SEAL)
Attest:

EDWARD M. FLETCHER, JR.
Attesting Officer

WILLIAM E. SCHUYLER, JR.
Commissioner of Patents